April 9, 1963   J. W. RICHARDSON, JR   3,084,734
APPARATUS FOR MANUFACTURING TRANSFORMER CORES
Original Filed Sept. 8, 1958   4 Sheets-Sheet 1
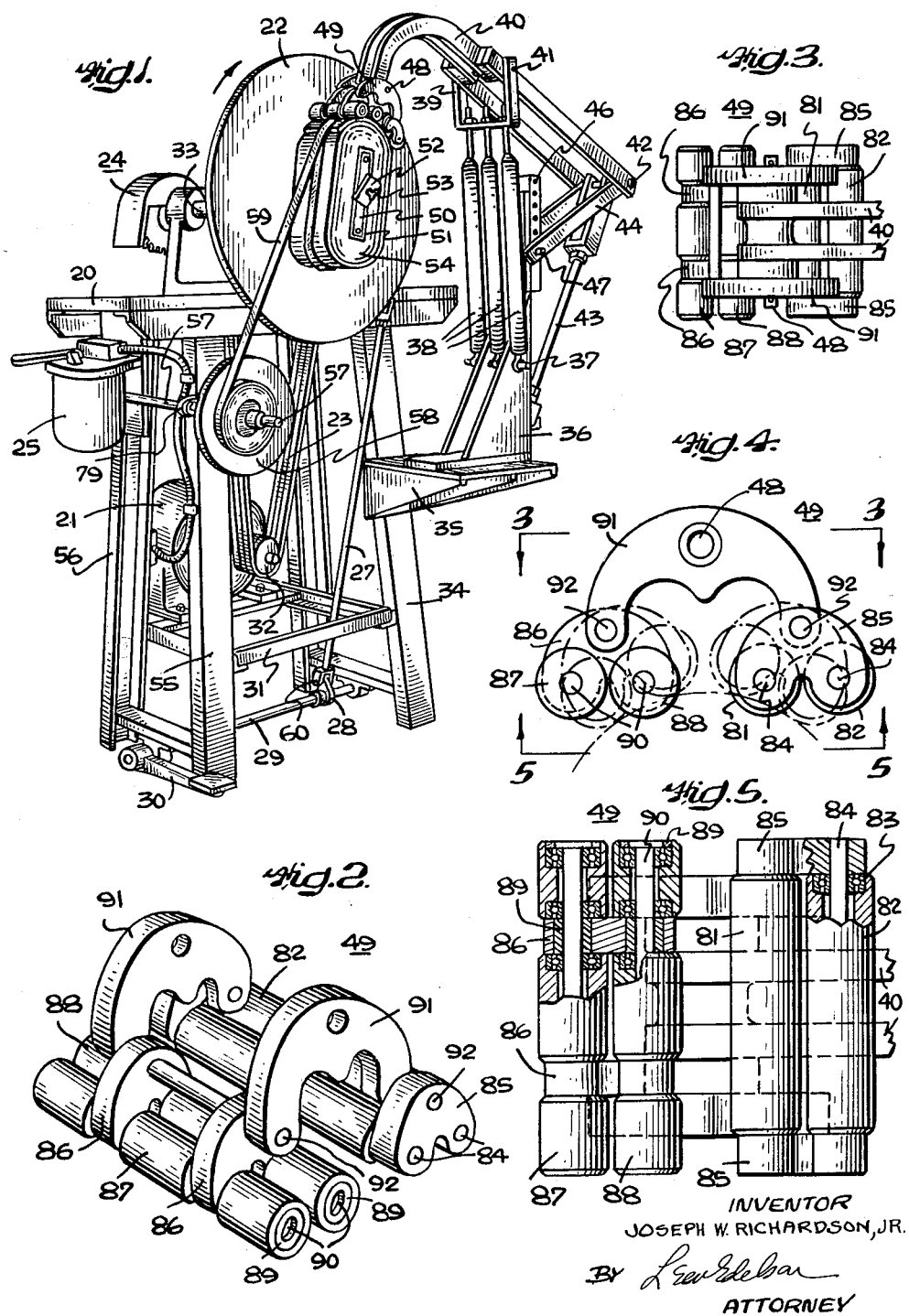
INVENTOR
JOSEPH W. RICHARDSON, JR.
ATTORNEY

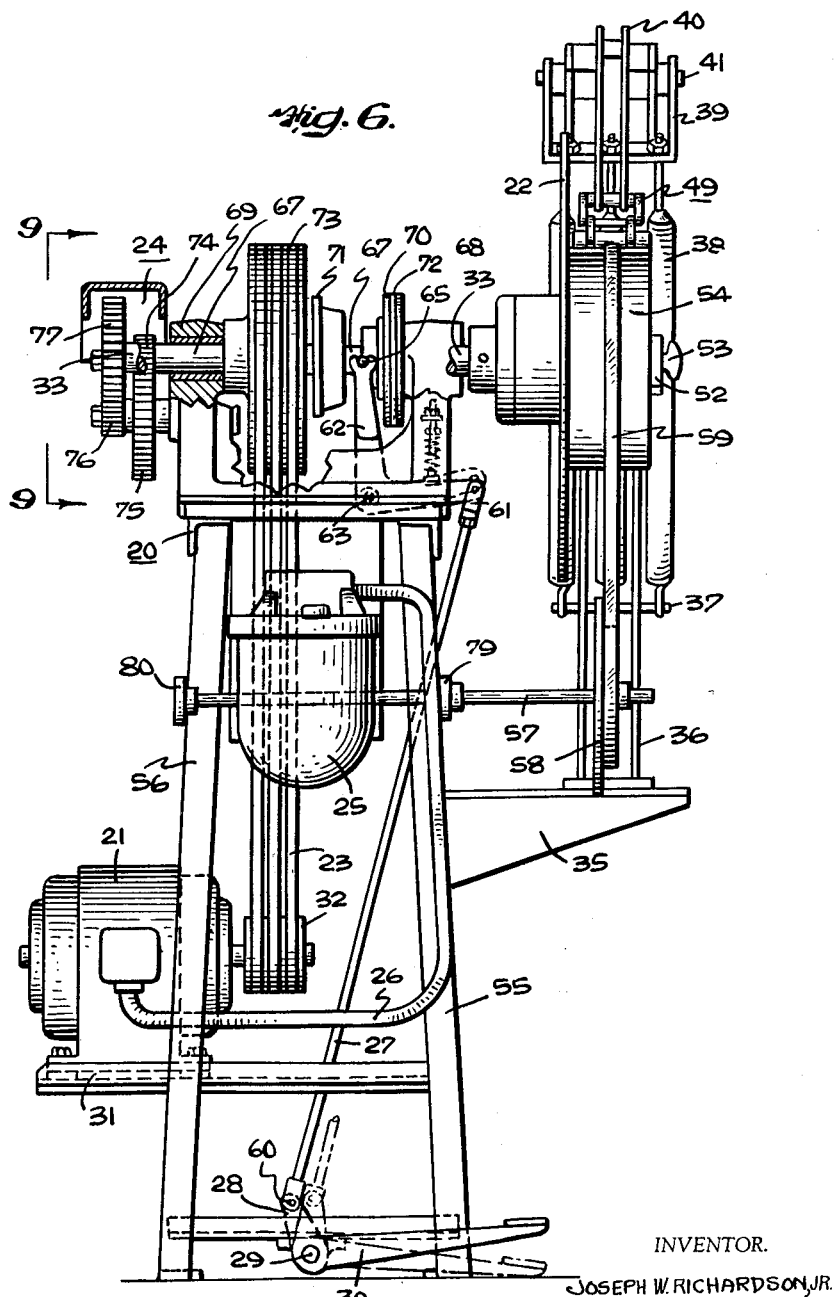

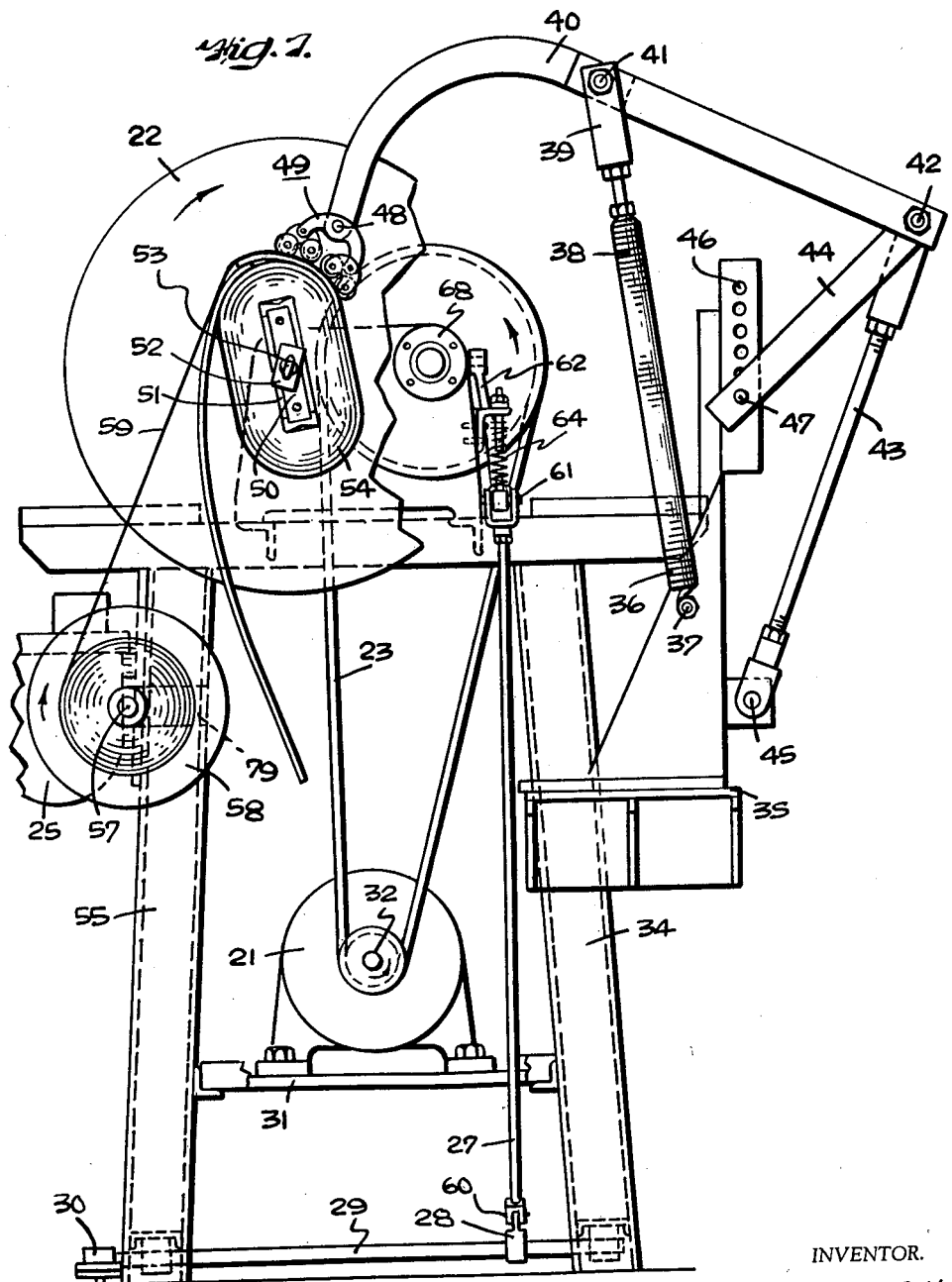

April 9, 1963     J. W. RICHARDSON, JR     3,084,734
APPARATUS FOR MANUFACTURING TRANSFORMER CORES
Original Filed Sept. 8, 1958     4 Sheets-Sheet 4
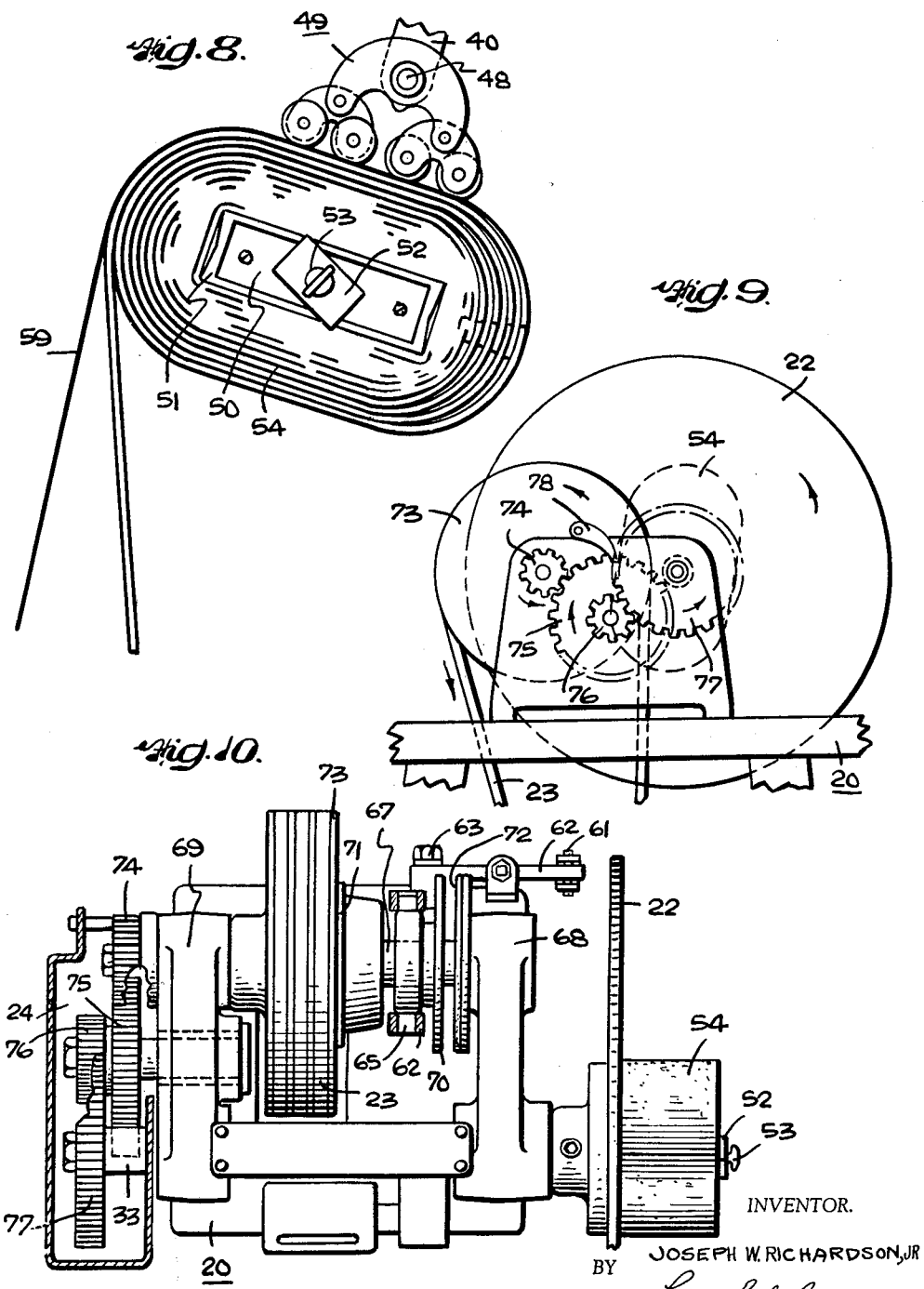
INVENTOR.
JOSEPH W. RICHARDSON, JR
BY
ATTORNEY United States Patent Office 3,084,734
Patented Apr. 9, 1963

1

3,084,734
APPARATUS FOR MANUFACTURING
TRANSFORMER CORES
Joseph W. Richardson, Jr., Horsham, Pa., assignor to H. K. Porter Company, Inc., Philadelphia, Pa., a corporation of Delaware
Original application Sept. 8, 1958, Ser. No. 759,521. Divided and this application Feb. 23, 1960, Ser. No. 10,175
6 Claims. (Cl. 153—64)

This invention relates to wound electrical transformer cores, and more particularly to the apparatus for winding such cores, this application being a division of my copending application, Serial No. 759,521, filed September 8, 1958.

Transformer cores of the wound type have been generally fabricated by first pre-winding such cores from a continuous strip of core material, then annealing the pre-wound core to provide a strain-free core, unwinding the annealed core and assembling the transformer by rewinding the core strip through the coil window. This method, although widely used, suffers from the fact that the unwinding of the annealed core and rewinding through the coil window cause new strain conditions to be set up in the core material due to the flexing of the core strip material during such operations, and thus, in some measure undoes the results of the annealing process. The fabrication of a core in the foregoing described manner is, moreover, relatively time consuming and therefore costly.

In order to alleviate these problems associated with continuous strip core transformers, the foregoing method was modified to a certain extent by cutting the core strip as it was unwound after annealing, such cuts being made once for each complete turn of the core winding. This procedure reduced the fabrication time of the finished transformer but introduced additional difficulties of two kinds. Firstly, the finished transformer core necessarily contained stacked butt-joints on one leg which introduced additional core losses. Secondly, the process of cutting the core strip after annealing introduced new strains in the core material, and so also tended to offset to some degree the benefits of annealing.

A variation of the above-described method is to pre-wind the core in the shape of an equilateral trapezoid, and after annealing to cut the core through the longer base. The cut ends of the longer base are then overlapped in the finished transformer core. In this way the butt-joint construction can be replaced by a lap-joint construction which improves the core losses. However, the strain conditions introduced due to cutting the core are still present. Moreover, the shape of the annealed core is changed from trapezoidal to rectangular after cutting and final assembly so that additional strains are set-up in the final transformer core.

Regardless of which of the foregoing described methods is used, all of the methods employ a spacer between successive turns of the pre-wound core prior to annealing. This is done so that the annealed unwound core may be reassembled in the finished transformer without distortion of the core shape. Without the spacer, successive turns of the core do not nest properly when reassembly is attempted. Up to now the spacer materials used have been made of paper, fabric or powder, and these materials have been found to break down when subjected to the annealing temperatures which are on the order of about 1500° F. This spacer material breakdown may take the form of charring or involve other changes all of which require that the core laminations, after annealing, be cleaned to remove this material. If this material is not cleaned away reassembly of the core is exceedingly difficult, if not impossible, and the core characteristics are seriously impaired. The cleaning process to which

2 cores made by the previously described methods are necessarily subjected is again time consuming and costly. The wound transformer core according to my invention does not suffer from the foregoing described difficulties encountered with previously known methods of fabricating such cores and is, therefore, inherently capable of producing wound transformer cores of superior characteristics at lower cost. Accordingly, it is a primary object of my invention to provide a novel method of fabricating a wound transformer core in which the necessity for cleaning the core laminae after annealing is completely eliminated.

Another object of my invention is to provide a novel method of fabricating a wound transformer core in which the benefits of annealing are realized to a much greater degree than in other transformers by eliminating the operation of cutting the core after the annealing process.

Yet another object of my invention is to provide a novel method of fabricating a wound transformer core in which the shape of the core after final assembly is the same as that just after annealing so that the core is essentially unstrained.

These and other objects will appear clearly hereinafter when considered in connection with the folowing detailed description of my invention when read in conjunction with an examination of the several drawings, wherein:

FIGURE 1 is a perspective view of one possible apparatus for fabricating a wound transformer core according to my invention and which shows a transformer in the process of being wound;

FIGURE 2 is a perspective view of a wound-core forming-roller which is part of the apparatus of FIGURE 1;

FIGURE 3 is a plan view of the forming-roller of FIGURE 2 taken along the lines 3—3 of FIGURE 4;

FIGURE 4 is a side elevational view of the forming-roller of FIGURE 2;

FIGURE 5 is a partially sectioned bottom view of the forming-roller of FIGURE 2 taken along the lines 5—5 of FIGURE 4;

FIGURE 6 is a partially sectioned side elevational view of the apparatus of FIGURE 1 with certain parts broken away to show otherwise obscured details;

FIGURE 7 is a front elevational view of the apparatus of FIGURE 1 with certain parts broken away to reveal other details;

FIGURE 8 is a fragmentary enlarged view of a partially wound core showing certain details of fabrication;

FIGURE 9 is a diagrammatic showing of the driving gear arrangement of the apparatus of FIGURE 1; and FIGURE 10 is a fragmented plan view of the apparatus of FIGURE 1 illustrating certain constructional details of the power transmission.

Before describing in detail the novel method of and apparatus for, fabricating wound transformer cores according to my invention, it will be an aid to understanding if the following brief general description is first considered. Instead of using a single strip of core material to form the pre-wound core, the core material is first pre-cut into strips. These strips may be cut to any convenient length, as for example strips of successively longer length wherein each strip corresponds to a single turn or to multiple turns of the core, or even to multiple fractional turns, or a mixture of lengths. The particular core illustrated in FIGURE 8 of the drawings, and which will be subsequently described in more detail, illustrates the use of successively longer single turn strips although the practice of my invention is by no means so restricted.

Fastened to one side of a mandrel whose shape and dimensions correspond to the window of the coil through which the core will eventually be wound, is one end of a shim-steel tape. One end of the first core strip is inserted between the mandrel and the tape and the mandrel is rotated to wrap the strip thereabout, the steel tape overlying the strip and binding it closely about the mandrel. As the trailing end of the first core strip is reached, the leading end of the second core strip is inserted between the trailing end and the just wound portion of the first strip to form a lap-joint. The steel tape binds the leading end of the second strip in place under the trailing end of the first strip and the process continues with the addition of successive strips as the mandrel is rotated until the entire core is built up with the steel tape interleaved between successive core turns. The core is then annealed and unwrapped to remove the steel tape spacer, and the core strips are ready for assembly into a complete transformer.

It will be appreciated at this point that the use of the shim-steel spacer type prevents the formation during annealing of inter-laminar deposits such as occur when spacer materials such as those previously mentioned are used. The necessity for cleaning the annealed core laminae is therefore eliminated. Furthermore, the use of pre-cut core strips disposes with the need for cutting the core after annealing, and so does not introduce new strains attributable to post-annealing core cutting. Moreover, the shape of the core strips is the same in the final transformer assembly as just after annealing so that post-annealing bending strains are substantially eliminated. As a consequence of the foregoing it should be now apparent that the wound core of a transformer fabricated according to my invention is substantially strain-free and has core characteristics very close to those of the core immediately after annealing.

Understanding at this point the general method of core fabrication according to my invention, turn now to an examination of the drawings for a detailed description of one form of apparatus by which the method may be readily practiced. Referring first to FIGURES 1 and 7, there is seen a frame or stand 20 having a shelf 31 to which is securely mounted a reversible electric motor 21. The motor 21, when energized from a source of electric energy through the switch 25 and the cable 26, causes the belts 23 coupled to the motor shaft by a pulley 32 to controllably drive a power transmission which is not visible in FIGURE 1. The power transmission in turn drives the rotatable vertical table 22 through a gear assembly 24 and a shaft 33.

Secured to a leg 34 of the stand 20 is a bracket 35 to which in turn is secured a bracket 36. Fastened to the upper end of the bracket 36 by a pin 37 are a set of springs 38 which are themselves secured at their upper ends to a yoke 39. Each arm of the yoke 39 is pivotally secured by a pin 41 to a rocker arm 40 which extends in opposite directions from the yoke pivotal axis. The rear end of the rocker arm 40 is pivotally secured by a pin 42 to one of the ends of each of two other arms 43 and 44. The free end of arm 43 is pivotally secured to the lower part of the bracket 36 by a pin 45, and the free end of arm 44 is adjustably pivotally engaged with the bracket 36 by a pin 47 extending through one of a series of holes 46 in the upper part of the bracket 36. To the fore end of the rocker arm 40 is pivotally secured by a pin 48 a forming-roller 49 whose structural details are shown in FIGURES 2 through 5.

Fastened to the roating table 22 is a block 50 whose geometric center coincides with the rotation axis of the table 22 so that the block 50 rotates with the table when the latter is driven. Slipped over the block 50 is a mandrel 51 which fits closely around the block so that there is little tendency for the mandrel to shift relative to the block in a plane parallel to the surface of the table 22. Fitted over a stud (not visible) in the block 50 is a clamping plate 52 which clamps the mandrel 51 against the table 22 when a wingnut 53 threaded onto the stud is screwed down against it, thereby preventing the mandrel from shifting away from the table 22. Partially built up on the mandrel 51 is a core 54. Pressed firmly against the core 54 is the forming roller 49, and it is seen that this roller will remain so pressed through the action of the springs 38 and the arms 40, 43 and 44 regardless of which part of the core periphery underlies it at any given moment. The forming roller 49 is biased by the springs 38 to move downward on an arc of the circle whose center is at pin 42 and whose radius is equal to the distance between pins 42 and 48. Such downward movement is restricted by the core 54 so that the pressing action results. Although the radius of the circle just defined always remains constant, the center of the circle, and hence its periphery, may be shifted away from the center of the core 54 by pivotally securing the arm 44 through successively higher holes 46 in the bracket 36. This adjustment is provided so that cores of larger size may be accommodated.

Rotatably secured to the legs 55 and 56 of the stand 20 by a shaft 57 and bearing brackets 79 and 80 is a reel 58 upon which is wound a steel tape 59. Assume for the moment that the core 54 has not yet been strated on the mandrel 51 and that the tape 59 is completely wound on its reel 58. The free end of the tape 59 is led off of the reel 58 and secured to one side of the mandrel 51, as for example with a piece of scotch tape. The table 22 is then rotated perhaps through one revolution so that the tape overlaps itself and thereby secures itself to the mandrel. One end of a pre-cut strip of core material is then inserted between the tape 59 and the mandrel 51 at the point where the tape tangentially leaves the mandrel surface and extends back to its supply reel 58. When now the table 22 is rotated in the direction shown in FIGURE 7, the core strip is wrapped about the mandrel 51, being conformed to the mandrel surface by the forming-roll 49 and bound tightly by the overlying tape 59 which unwraps from the reel 58. The next strip of core material is inserted as shown in FIGURE 7 and the process described is continued until the desired size core is achieved.

At this point, the steel tape is cut and the free end of the tape which is interleaved with the core strips is fastened down. A retainer clamp (not shown) is then secured about the finished core. The core with the mandrel is removed from the table 22 by releasing the wingnut 53 and clamping plate 52, and disengaging the forming-roller 49 from the core periphery. The core is then annealed and thereafter replaced on the table 22, but the forming-roller 49 is not re-engaged wtih the core periphery since the annealing process has eliminated the tendency of the core laminae to spring open. The outer end of the steel tape is unfastened and secured to the free end of the steel tape remaining on the reel 58, as for example by spot-welding. The electric motor 21 is then run in reverse so that the table 22 rotates counter to its direction during core winding. The core 54, of course, rotates wtih the table 22 so that the tape 59 may be rewound upon the reel 58 and the core laminae may be successively stripped from the core, beginning with the outermost lamination and progressing inward until the innermost lamination is removed from the mandrel 51.

The core laminae are now immediately ready for assembly into a complete transformer. The shim-steel tape 59, which may be approximately 2 mil thick cold-rolled steel, may be reused many times over since it is not affected by the annealing process.

Referring now to FIGURES 1, 6, 9 and 10 for an understanding of the mechanical details of the core winding apparatus, there will be seen a treadle 30 pivotally secured to the bottom of the stand 20 by a horizontal shaft 29. Keyed or otherwise fastened to the shaft 29 is a link 28 which is pivotally connected by a pin 60 to the lower end of a generally vertically extending shaft 27. The upper end of the shaft 27 is pivotally linked to one end of an angle arm 62 by a pin 61. The vertex of the angle arm 62 is pivotally secured to the stand 20 by a lug 63 so that the arm 62 may pivot about a horizontal axis when the shaft 27 moves vertically in response to actuation of the treadle 30.

As best seen in FIGURES 6 and 7 a compression spring 64 biases the angle arm 62 so that the vertical portion thereof is right-shifted and the horizontal portion is depressed. The spring 64, therefore, acting through the shaft 27 causes the treadle 30 to assume a normally up position as indicated in solid lines in FIGURE 7. When the machine operator depresses the treadle 30 by overcoming the spring bias, the shaft 27 moves upward and causes the vertical portion of the angle arm 62 to be left-shifted, at the same time placing the spring 24 in compression. When the operator removes his foot from the treadle, the compressed spring 24 expands and restores the treadle 30 to its up position. The up treadle position corresponds, therefore, to right-shifted position of the upper portion of angle arm 62, and the down treadle position corresponds to left-shifted position. As will be explained, left-shifted and right-shifted angle arm 62 positions result respectively in rotation and braking of the table 22, so that "down treadle" produces rotation and "up treadle" produces braking of the rotatable table 22.

As best seen in FIGURES 6 and 10, the vertical portion of the angle arm 62 terminates in a yoke which pivotally engages a pair of studs 65—65 on opposite sides of a collar 66. Rotatable within the collar 66 is a bearing (not visible) which is fixed to a shaft 67 for rotation therewith, the shaft 67 being journalled in end bearing 68 and sleeve bearing 69 fixedly secured to the stand 20. Also fixedly secured to the shaft 67 for rotation therewith are a brake disc 70 and a clutch disc 71. The rotatable brake disc 70 is adapted for frictional engagement with a fixed brake disc 72 which is secured to the housing of the bearing 68 when the arm 62 is in right-shifted position (up treadle). The rotatable clutch disc 71 is adapted for frictional engagement with a clutch surface on the face of the pulley 73 which presents toward the disc 71 when the arm 62 is in left-shifted position (down treadle). It is, therefore, clear that when the brake discs 70 and 72 are engaged, the shaft 67 will be braked to a stop and its rotation will cease. When, however, the clutch disc 71 engages the pulley 73, the shaft 67 will rotate with the pulley. The pulley 73, which is continuously rotated by the motor 21 via the belts 23, is freely rotatably mounted about the shaft 67 so that the shaft does not rotate with the pulley unless the clutch is engaged.

The table 22 rotates with the shaft 33 which is driven by the shaft 67 through the gear assembly 24 when the shaft 67 is driven by the pulley 73 through the clutch. The transmission of power from shaft 67 to shaft 33 through the gear assembly 24 is best understood by referring to FIGURES 6, 9 and 10. A gear 74 fixed to the shaft 67 engages a large idler gear 75. Fixed upon the same shaft as the idler gear 75 and rotatable therewith is a small idler gear 76. This small idler gear 76 is in turn engaged with a larger gear 77 fixed upon the shaft 33. As shown, the rotational speed of shaft 33 is substantially reduced below the speed of shaft 67 by virtue of the step-down arrangement of gear assembly 24. Various speed ratios can be employed merely by changing the gear ratios. FIGURE 9 also shows a dog 78 which is employed to prevent backward rotation of the table 22 during core winding. When, however, the annealed core is replaced upon the table 22 for unwinding, the dog 78 is pivoted out of the way so that the gears may reversely rotate when the motor 21 is electrically reversed through the switch 25.

Returning now to an examination of FIGURES 2 through 5 which illustrate the novel forming-roller assembly 49, it is seen that the roller assembly includes a pair of individually pivotable double roller subassemblies. Rollers 81 and 82 are free to rotate on ball bearing assemblies 83 which are secured to a pair of arcuate end plates 85—85 by pins 84, whereas rollers 87 and 88 are free to rotate on ball bearing assemblies 89 secured to a similar pair of arcuate plates 86—86 by pins 90. The arcuate plates 85—85 and 86—86 are pivotally pinned to a further set of arcuate plates 91—91 by pins 92, and the plates 91—91 are in turn pivotally pinned to the arm 40 by the pin 48. In operation, the entire forming-roller assembly 49 pivots about the pin 48 while the individual double roller subassemblies pivot about the pins 92. It will be appreciated that this novel construction allows the rollers to conform closely to the core surface and provide a very effective ironing action to produce a tightly wound core. The shim-steel tape 59 is therefore required only to bind the core strips and is not required to form the strips, so that high tape tension is not necessary.

Although my invention has been described in connection with a particular apparatus for practicing the same, it will be understood, of course, that such description is for illustrative purposes only, and various changes and modifications may be made from time to time without departing from the general principles or real spirit thereof, and it is intended to claim the same broadly, as well as specifically, as indicated by the appended claims.

What is claimed as new and useful is:

1. In a apparatus for producing a laminated transformer core formed of a plurality of strips of magnetizable material successively wound about one another, in combination, a rotatable jig adapted to removably receive thereon a mandrel about which the transformer core strips are successively wound with their adjoining ends in overlapping relation, means for wrapping a continuous length of metal tape about the transformer core laminations as the latter are layered upon said mandrel, and means for simultaneously interrupting the rotation of said jig and the wrapping of said tape at desired intervals to permit the successive placement in position of the transformer core strips.

2. In an apparatus as defined in claim 1 wherein the tape is fed to the core from a supply reel rotatable about an axis which parallels and is laterally offset from the rotating axis of the mandrel, whereby said tape is fed to the core along a line which intersects at an angle the vertical plane coincident with the axis of rotation of the mandrel and serves to bind the overlapped ends of the core strips against each other and their underlying core body.

3. Apparatus for making wound transformer cores comprising in combination, a rotatable table and means for securing a core form thereto, means coupled to said table for selectively rotating said table in a given sense for time intervals of controlled duration, pressing means adapted to direct bearing pressure toward the surface of a core form secured to said table about which surface the transformer core material is wound, tape supply means including a metal tape adapted to be fed from the supply means to directly underlie the pressing means so that the latter binds the metal tape around the core material being wound as the pressing means conforms the core material to the core form.

4. The apparatus according to claim 3 further including means for selectively reversing the rotational sense of said rotatable table so that a tape bound core may be unwound and the metal tape returned to the tape supply for subsequent reuse.

5. The apparatus according to claim 3 wherein said pressing means comprises a pair of roller subassemblies each of which subassemblies includes a pair of rollers freely rotatable on non-coincident axes parallel to the rotational axis of said table, said subassemblies each being pivotable as a unit on non-coincident axes parallel to the rotational axis of said table.

6. The apparatus according to claim 5 wherein at least one roller of one of said roller subassemblies comprises a plurality of coaxially aligned cylindrical sections disposed for rotation upon a common shaft, said shaft being secured to and carried by a yoke at points between adjacent ones of said roller cylindrical sections.

References Cited in the file of this patent

UNITED STATES PATENTS

| | | |
|---|---|---|
| 1,977,503 | Warren | Oct. 16, 1934 |
| 2,141,151 | Fernberg | Dec. 20, 1938 |
| 2,264,800 | Horstman et al. | Dec. 2, 1941 |
| 2,542,806 | Ford et al. | Feb. 20, 1951 |
| 2,588,173 | Somerville | Mar. 4, 1952 |
| 2,767,382 | Steinmayer | Oct. 16, 1956 |

FOREIGN PATENTS

| | | |
|---|---|---|
| 611,953 | Great Britain | Nov. 5, 1948 |